E. B. MYERS.

Improvement in Releasing Devices for Stables.

No. 122,188.  Patented Dec. 26, 1871.

Witnesses:

Inventor.

E. B. Meyers
By Daniel Breed
Atty

UNITED STATES PATENT OFFICE.

EDMUND B. MYERS, OF YORK, PENNSYLVANIA.

IMPROVEMENT IN RELEASING DEVICES FOR STABLES.

Specification forming part of Letters Patent No. 122,188, dated December 26, 1871.

*To all whom it may concern:*

Be it known that I, EDMUND B. MYERS, of York, in the county of York and State of Pennsylvania, have invented a new and useful Improvement in Cattle Escapes, or in the manner of fastening and releasing cattle and horses in the stable.

My invention or improvement is particularly useful in letting cattle loose for watering, and is so arranged as to release one after another in regular succession from one end of the stable to the other. It is also very important in case of fire, as the whole stable full of cattle or horses may be released in a moment by a single movement of a lever. My invention consists of a series of sliding bolts or their equivalents, so arranged with a slide rod as to be moved simultaneously, and yet release one animal after another in regular succession.

Figure 1:
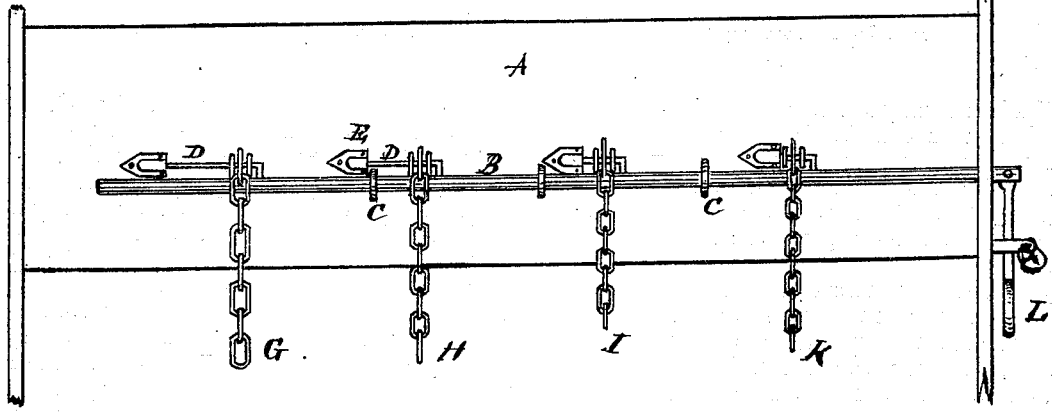
Figure 2:
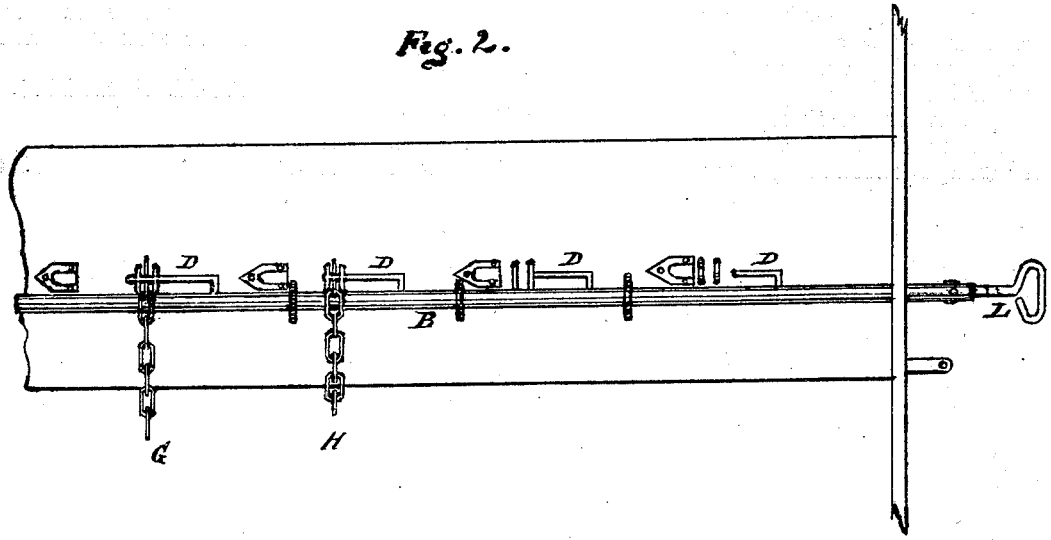

In the accompanying drawing, Fig. 1 is a front view of a feed-trough with my improvement attached. Fig. 2 is the same with the bolt drawn part way back, and two of the chains released.

The feed-trough is seen at A; a rod, B, is fastened to the front of the trough, and made to slide in the staples C. This slide-rod has a series of bolts, D, which pass into staples E, and thus fasten the chains G H I K by which the cattle or horses are secured. It will be observed that the short bolts D are of different length or so arranged as to release one animal after the other, beginning at the right hand. The slide-rod B is moved by a lever L, which may be locked, as seen in Fig. 1, either inside or outside of the stable. By this arrangement one animal is released after another in regular succession, or in case of fire all the animals may be let loose at a single movement of lever L.

Having described my invention I claim—

The arrangement of the series of bolts D, when made of different length, or so arranged in combination with the slide-rod B, as to release the horses or cattle in regular succession, substantially as set forth.

EDMUND B. MYERS.

Witnesses:
DANIEL BREED,
EDM. F. BROWN.

(144)